Feb. 7, 1956  I. S. JOSEPH  2,733,637
FLEXED PLASTIC MIRROR
Filed April 24, 1953  2 Sheets-Sheet 1
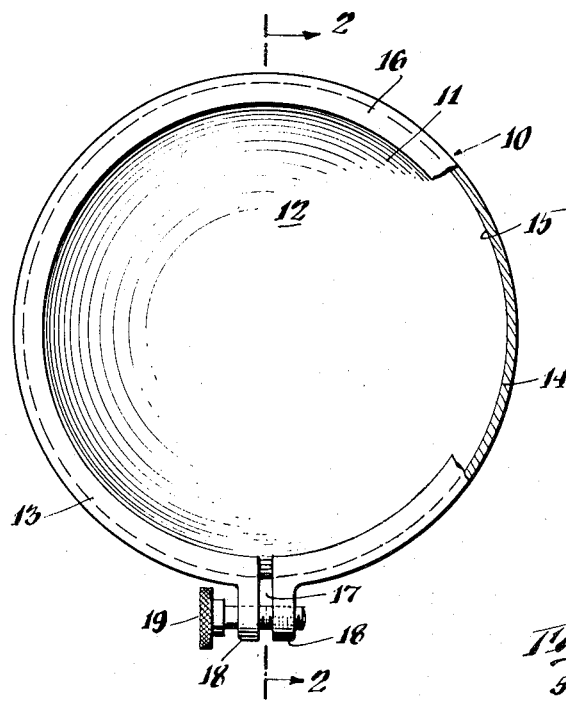
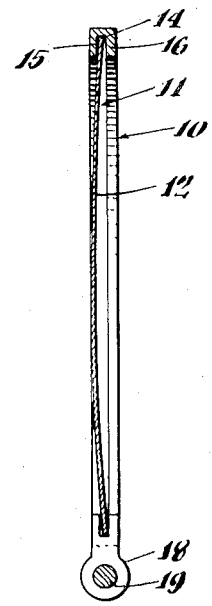
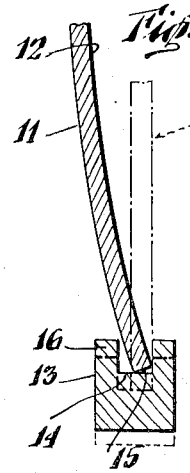
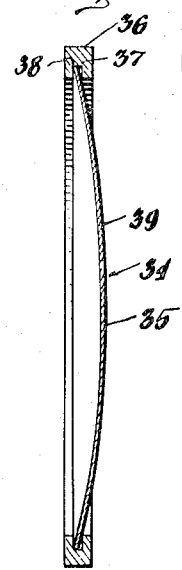
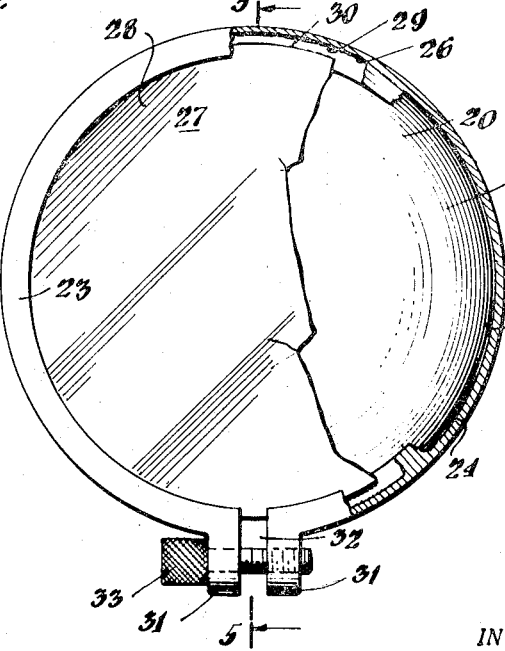
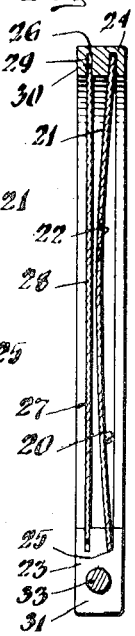
INVENTOR.
Irwin S. Joseph
BY
Duell and Kane
ATTORNEYS Feb. 7, 1956 I. S. JOSEPH 2,733,637
FLEXED PLASTIC MIRROR
Filed April 24, 1953 2 Sheets-Sheet 2
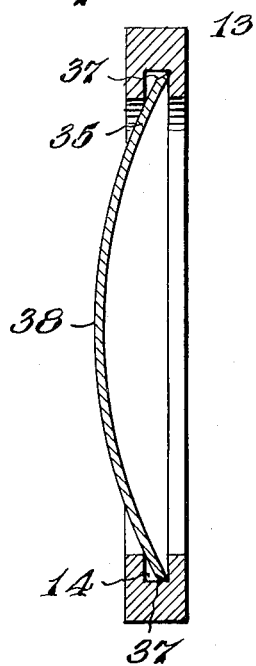
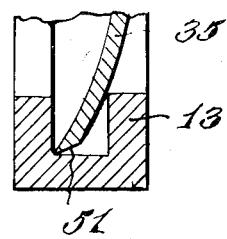
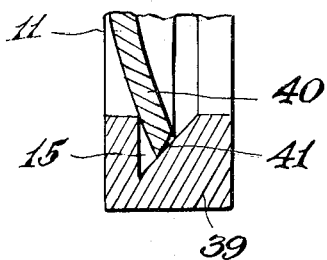
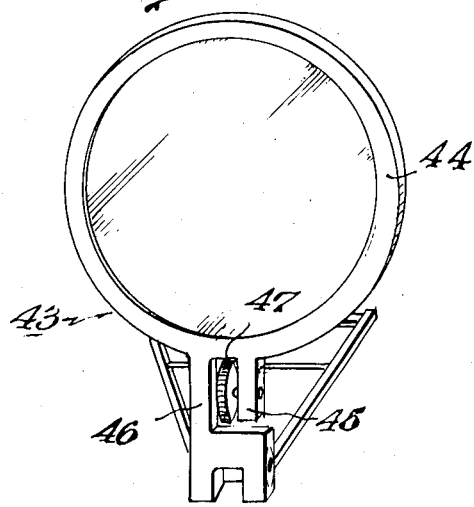
INVENTOR
IRWIN S. JOSEPH
BY Duell and Kane
ATTORNEYS United States Patent Office 2,733,637
Patented Feb. 7, 1956

2,733,637

FLEXED PLASTIC MIRROR

Irwin S. Joseph, New York, N. Y.

Application April 24, 1953, Serial No. 351,140

2 Claims. (Cl. 88—96)

This invention relates to a mirror, the reflecting surface of which can be variably adjusted, and more particularly to an adjustable mirror wherein the reflecting surface is subjected to a change in curvature.

It is an object of this invention to provide a magnifying mirror or a diminishing mirror which is capable of having its degree of magnification or diminution changed.

It is another object of this invention to provide a magnifying mirror of simple assembly.

It is a further object of this invention to provide a magnifying and focusing mirror in which the focal distance may be adjusted by flexing the curved reflecting surface of the mirror to increase or decrease the focal length.

It is another object of this invention to provide a diminishing mirror in which the diminution of the size of the image of the object may be adjusted by flexing the curved reflecting surface of the mirror.

It is still another object of this invention to provide a magnifying mirror in which the magnification of the size of the image of the object may be adjusted by flexing the curved reflecting surface of the mirror.

It is still another object of this invention to provide an adjustable magnifying mirror mounted in a stand wherein the mirror frame is adjustable and integral with the mirror stand.

It is a still further object of this invention to provide a mirror in which the adjustment of the reflecting surface may be achieved simply by the operation of some mechanism such as a screw in a frame on the mirror.

It is still another object of this invention to provide a flexible reflecting surface mirror which is simple in operation and inexpensive in manufacture and not subject to easy breakage or fracture.

These and other objects of this invention will become more apparent upon consideration of the following description taken together with the accompanying drawings in which:

Fig. 1 is a rear elevation of an embodiment of the mirror of this invention as seen from the rear with the frame partly broken away;

Fig. 2 is a vertical section of the mirror of this invention shown in Fig. 1 taken on line 2—2 in the direction of the arrows;

Fig. 3 is an enlarged section of one edge of the mirror of this invention in cooperation with its supporting frame;

Fig. 4 is an elevation of a modification of the mirror of this invention partly broken away;

Fig. 5 is a vertical section of the mirror shown in Fig. 4 taken on lines 5—5 in the direction of the arrows;

Fig. 6 is a vertical section of a further modification of the mirror of this invention;

Fig. 7 is a vertical section of a further modification of the mirror of this invention;

Fig. 8 is an enlarged section of one edge of a variation of the mirror of the modification of Fig. 7;

Fig. 9 is an enlarged section of one edge of another modification of the mirror of this invention in co-operation with a modified supporting frame, and Fig. 10 is a respective view of a mirror of this invention as seen in its flexible frame and having a stand integral with the frame.

In magnifying mirrors and diminishing mirrors, it is frequently desirable to alter the field of the reflecting surface. In general, this invention provides a mirror in which an infinite number of alterations may be made in the reflecting surface. The embodiment of this invention shown in the mirror of Fig. 1 provides a mirror 10 made up of a flexible disc 11 which has a reflecting surface 12. Around the circular disc 11, a frame 13 encircles the circumferential edge 15 of the disc 11. A groove 14 recessed in the inner surface of the circular frame 13 receives the circumferential edge 15 of the disc 11.

The frame 13 is interrupted by a split 17, shown in Fig. 1 at the bottom of frame 13. The frame 13 is provided with two lugs at this split 17. The lugs 18 are each formed on a terminal end of the frame 13 at the split 17. The lugs 18 are connected together by a bolt 19 which bears against one lug and is screw threaded into the other lug 18 so as to be capable of drawing them together or releasing them to spring apart under the natural outward spring tension of the curved frame 13.

The disc 11 is composed of a flexible material such as methyl methyacrylate which is suitably coated so as to provide the reflecting surface 12. The disc 11 is initially flat and has a diameter such as to allow it to be placed within the frame 13 so that its circumferential edge 15 will extend into the groove 14. The flat disc 11 under pressure from a constriction of the frame 13 has a curvature formed in its radial plane to give it a slight dish-like shape. This disc 11 thus dish shaped and held in the circular frame 13 will provide, by means of its reflecting surface 12, a focusing mirror which will have a predetermined degree of magnification of the image reflected. If the curvature of the disc in the radial plane is increased, the focal length of the reflecting surface 12 will be shortened and the degree of magnification increased. Conversely, if the radius of curvature of the disc is decreased, the focal length of the reflecting surface 12 is lengthened and the magnification is decreased. The decrease of magnification may be continued to the point where the reflecting surface is flat.

In the embodiment of the invention shown in the drawing, the curvature of the disc 11 can be varied by adjustments in the diameter of the frame 13 brought about by turning the bolt 19 in the lugs 18. When the lugs 18 are drawn together, the diameter of the circular frame 13 is decreased constricting the frame 13 on the disc 11. This constriction bears the frame 13 against the disc 11, forcing it to bell inward and assume a more curved condition. With the radius of curvature of the disc 11 thus increased, the magnification and focusing are changed as described above. When the lugs 18 are moved apart by releasing the bolt 19, the resilience of the material making up the disc 11 will cause it to flatten out, thereby increasing the radius of curvature and changing the magnification and focusing as described above. The changed shape of the disc 11, upon increasing the diameter of the frame 13 by moving the lugs 18 apart, is illustrated in Fig. 3. In this figure, the disc 11 is shown in a more curved position in full lines and in a flat position in dotted lines. Correspondingly, the frame 13 is shown in two positions. The first position in full lines is that of the smaller diameter and the second position in dotted lines is that of the frame when it is released to the greatest diameter. Thus, by increasing and decreasing the diameter of the frame 13, the diameter of the circumferential edge 15 is increased and decreased and the radius of curvature of the disc 11 is correspondingly increased and decreased. These changes in the radius of curvature of the disc 11 bring about corresponding changes in the magnification and focusing of the reflecting surface 12 as described above. The direction of the flexure of the disc 11 can be determined by providing a bevelled edge on the disc 11. Referring to Fig. 3, this bevelled edge may be made on the plastic disc 11 either at the right side or the left side of the disc 11. The bevelled edge provides a surface which is at an oblique angle to the face of the disc 11. The bevelled edge controls the flexure of the disc 11 by determining the direction in which the flexure will go. If the bevelled surface is on the left side of the disc 11, as shown in Fig. 3, the flexure of the disc 11 will be in the direction shown by the position of the disc in full lines in that figure. If the bevelled surface is on the right side of the disc 11, the flexure of the disc 11 will be in the direction shown by the position of the disc 11 in Fig. 6.

In the modification of this invention shown in Fig. 7 a reflective disc 49 is shown modified by a bevelled surface 51 formed on the left side of the disc 49. The bevelled surface 51 meets a reflective surface 52 of the disc 49 at an acute angle forming a periphery 50. As a result periphery 50 rests against the frame 13 contacting the bottom of the groove 14. The frame 13 is constrictable in the manner described in connection with the above noted embodiments. Such constriction of the frame 13 bears the surface of the groove 14 against the periphery 50. When thus constricted the disc 49 will flex in a leftward direction. This flexure is determined by the bevelled surface 51. The bevelled surface 51 is at an acute angle with the inner-surface of the groove 14 and the reflecting surface 52. The bevelled surface 51 controls the flexure of the disc 49 upon the constriction of the frame 13 because the disc 49 pivots on its periphery 50 under the constricting force and the pivoting is only in the direction of the bevelled edge 51.

It will be understood that the reflective surface 52 is shown in Fig. 7 as a "front surface mirror" for the purpose of this description. It is preferred in practice to employ a "rear surface mirror" suitably coated for protection.

If the bevelled surface 51 is on the right side of the disc 49 as shown in Fig. 8, the flexure of the disc upon constriction of frame 13 will be to the right as seen in Fig. 8, or opposite to the direction shown in Fig. 7.

A further modification is shown in Fig. 9. In this modification the disc 11 similar to the disc 11 of Figs. 1 and 3 has its circumferential edge 15 mounted in a frame 53 which has a groove 40 receiving the circumferential edge 15. An inner or bottom wall 41 lies oblique to the radius of the frame 53. Consequently the circumferential edge 15 when seated in the groove 40 does not bear flatly against the inner wall 41 but is perched thereon by one edge as shown in Fig. 9. Upon constriction of the frame 13 in the manner described above, the circumferential edge 15 is cocked over by the constricting force to flex the disc 11. In this modification the inclined inner wall 41 determines the direction of the flexure. The flexure of the disc 11 is to the side that the inner wall 41 faces. In Fig. 9, this is to the left and the flexure is to the left.

A modification of this invention is shown in Figs. 4 and 5. In this modification, a mirror 20 contains a flexible disc 21 similar to the flexible disc 11 of the mirror 10 in the embodiment shown in Fig. 1. This disc 21 has a reflecting surface 22 and is held in a frame 23 which is recessed with an internal groove 24 for receiving the circumferential edge 25 of the disc 21. The inner surface of the frame 23, however, is recessed with a second internal groove 26 parallel to, but spaced from the groove 24. A mirror 27 is mounted in the groove 26 and is thus supported in the frame 23. This mirror 27 is any flat mirror providing a reflecting surface 28 which has no magnification. The groove 26 is made up of a sufficient depth to provide a free space 29 beyond the circumferential edge 30 of the mirror 27. The frame 23 has lugs 31 formed on each side of a split 32 similar to the construction in the embodiment in Figs. 1 and 2. The lugs 31 are drawn together and separated by a bolt 33 and an adjustment of the frame 23 is obtained in the same manner as described above in connection with the frame 13. The disc 21 is accordingly flexed to provide the desired change in magnification or focal length. However, the flat mirror 27 remains unchanged by these variations in the diameter of the frame 23. The free space 29 in the groove 26 allows these changes in diameter of the frame 23 without affecting the mirror 27. The space 29 is of sufficient depth so that the groove 26 never bears against the circumferential edge 30 of the mirror 27. This combination mirror thus provides both a focusing, magnifying reflecting surface and a flat or parallel reflecting surface.

In the foregoing description, the mirror of this invention has been described as applied to a magnifying or focusing mirror. This invention may similarly be applied to a diminishing mirror. A diminishing mirror is a mirror having an outwardly curved reflecting surface that causes objects reflected therein to be progressively smaller according to an increase in their distance from the reflecting surface. Such mirrors are of use because of the wide angle of their field, one particular application being in certain automobile mirrors. The width of the angle of vision varies with the curvature of the reflecting surface in mirrors of this nature. The greater the curvature is, the greater will be the field of vision.

In Fig. 6, a diminishing mirror is shown according to this invention. The mirror 34 is made up of a flexible disc 35 having a reflecting surface 39. The disc 35 is held in a frame 36 which has an internal groove 37 receiving a peripheral edge 38 of the disc 35. The disc 35 is normally flat but may be flexed to provide the reflecting surface 39 with a convex or outward curvature. This flexure is brought about by a constriction of the frame 36, similar to that described above in connection with frames 13 and 23. This constriction of the frame 36 and the resultant curvature of the reflecting surface 39 may be varied in the same manner as described above in connection with the embodiments herein. By thus varying the curvature of the reflecting surface 39, a variable diminishing mirror is provided, which by the variation of its reflecting surface has a variable field of vision.

A magnifying or de-magnifying mirror of pre-determined focal length can be obtained by forcing under pressure a flat flexible mirror disc into a groove of a fixed closed frame in which the maximum periphery of the groove is smaller than the periphery of the disc. When the disc is thus snapped into position it will be forced to bell inward or outward corresponding to the direction of the pressure applied and will produce a magnifying or de-magnifying mirror of pre-determined focal length.

In Fig. 10, a mirror of this invention is shown with an integral stand for the mirror. An adjustable mirror 43 has a constrictable frame 44. The frame 44 is provided with a pair of lugs 45 and 46. On lug 45 is mounted a thumbscrew 47 which threads into the lug 46 to draw said lugs together or screws out of lug 46 to force said lugs apart. As described above in connection with Fig. 1, such relative motion between the lugs 45 and 46 results in an expansion or contraction of the mirror encompassing frame 44. Stand 48 is provided for supporting the mirror 43.

By this invention, a focusing mirror is provided in which the focal length can be changed by the simple adjustment of a set screw. The change in the focal length is gradual and, therefore, subject to infinite variation and delicate control. Further advantages of this invention include the simplicity of the structure and its adaptability. This adaptability is demonstrated by the modification shown in Figs. 4 and 5 wherein both an adjustable focusing mirror and a flat non-foscusing mirror are contained within a single convenient frame. With an adjustable focusing mirror of this nature, it is possible to provide a reflector which will give magnification and sharp focusing through a wide variety of positions. For example, the mirror may be used for reflecting an image at a distance of 1 foot on one occasion and, this might be changed to reflecting with the same mirror, an image at many feet upon another occasion.

Still further advantages of this invention are obtained in connection with its application to a diminishing mirror. By providing a diminishing mirror according to this invention, it is possible to produce a mirror having a variable wide angle field of vision. The field of vision may be increased from that of a flat mirror through various degrees to a mirror having a single reflecting surface forming an image through a wide angle. The ultimate width of the angle of vision is limited only by the extent to which it is desired to carry the curvature of the mirror.

Another modification of this invention employs a groove frame having a given diameter and an internal groove. Into this frame is placed a plastic mirror disc having a greater diameter than the diameter of the groove ring. The periphery of the plastic disc seats in the internal groove of the ring. The plastic disc is forced into the ring and springs into the groove to permanently set therein. Retained in this position the plastic disc is permanently curved to provide either a diminishing or magnifying mirror.

As indicated by the modifications described in connection with Figs. 4, 5 and 6 various modifications may be made of this invention without departing from the spirit thereof. For example, the reflecting surface 12 may be placed on the opposite side of the disc 11 from which the disc 11 is viewed. In Fig. 3, the reflecting surface is shown on the side from which it is intended that the mirror 10 be viewed. This invention will operate with equal effect if the silver or other reflecting element is placed on the opposite side of the disc 11. Therefore, the embodiments shown and described above are for the purposes of illustration and it is intended that this invention be limited only by the scope of the appended claims.

This application is a continuation in part of my pending application Serial Number 162,472 filed May 17, 1950, now abandoned.

I claim:

1. A circular mirror comprising in combination a flexible round disc having lateral thinness and a relatively great breadth, a circumferential edge around said disc, a reflecting surface on one side of said disc, a circular frame encompassing the circumference of said disc, an annular groove in the inner side of said circular frame having a substantially greater thickness than said thin disc, said groove receiving said circumferential edge, a surface in said groove at an acute angle to the breadth of said disc, said circumferential edge merely resting against said surface; and means for constricting said frame on said disc to reduce the plane area enclosed by said frame and shorten the circumference of said annular groove whereby said disc is flexed and bears against said surface.

2. An adjustable mirror comprising in combination a flexible round disc having lateral thinness and a relatively great breadth, a circumferential edge around said disc, a reflecting surface on one side of said disc, a circular frame encompassing the circumference of said disc, a bevelled surface on one side of said disc adjoining and at an angle to said circumferential edge, an annular groove in the inner side of said circular frame having substantially greater thickness than said thin disc, said groove receiving said circumferential edge and at least a portion of said bevelled surface, said circumferential edge merely resting against said annular groove and means for constricting said frame on said disc to reduce the plane area enclosed by said frame and shorten the circumference of said annular groove whereby said disc is flexed in the direction of said bevelled surface.

References Cited in the file of this patent

UNITED STATES PATENTS

| 408,511 | O'Brien | Aug. 6, 1889 |
| 683,163 | Wideen | Sept. 24, 1901 |
| 713,643 | Jackson | Nov. 18, 1902 |
| 1,269,422 | Gordon | June 11, 1918 |
| 2,051,791 | Luce | Aug. 18, 1936 |
| 2,300,251 | Flint | Oct. 27, 1942 |
| 2,555,387 | Zabel | June 5, 1951 |

FOREIGN PATENTS

| 499,079 | Germany | May 31, 1930 |
| 501,072 | Germany | June 27, 1930 |